(12) United States Patent
Kintaka et al.

(10) Patent No.: US 7,431,984 B2
(45) Date of Patent: Oct. 7, 2008

(54) HYBRID LENS USING TRANSLUCENT CERAMIC

(75) Inventors: Yuji Kintaka, Omihachiman (JP); Satoshi Kuretake, Yasu (JP); Nobuhiko Tanaka, Hirakata (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/727,616

(22) Filed: Mar. 27, 2007

(65) Prior Publication Data
US 2007/0171538 A1 Jul. 26, 2007

Related U.S. Application Data (63) Continuation of application No. PCT/JP2005/014743, filed on Aug. 11, 2005.

(30) Foreign Application Priority Data
Oct. 1, 2004 (JP) .............................. 2004-289886

(51) Int. Cl.
*B32B 18/00* (2006.01)
*B32B 27/20* (2006.01)
*G02B 1/02* (2006.01)
*G02B 1/11* (2006.01)
*C04B 35/46* (2006.01)

(52) U.S. Cl. .................. 428/325; 428/323; 428/688; 428/702; 501/135; 359/350; 359/355; 359/580; 359/581; 359/642

(58) Field of Classification Search .............. None
See application file for complete search history.

(56) References Cited

U.S. PATENT DOCUMENTS

| 4,019,915 | A | * | 4/1977 | Miyauchi et al. | ............. | 501/135 |
| 4,211,758 | A | * | 7/1980 | Buhrer | ........................ | 423/263 |
| 4,649,003 | A | * | 3/1987 | Hashimoto et al. | ........... | 264/634 |
| 5,091,348 | A | * | 2/1992 | Woodhead et al. | ........... | 501/136 |

(Continued)

FOREIGN PATENT DOCUMENTS

JP 03-129783 * 6/1991

(Continued)

OTHER PUBLICATIONS

Written Opinion of the International Searching Authority dated Oct. 1, 2004.

*Primary Examiner*—Vivian Chen
(74) *Attorney, Agent, or Firm*—Dickstein, Shapiro, LLP.

(57) ABSTRACT

A hybrid lens (3) has a structure in which a resin layer (2) composed of an ultraviolet curable resin is formed on the surface of a lens base material (1) composed of translucent ceramic. The lens base material (3) is composed of translucent ceramic containing as a main component an oxide with a perovskite structure represented by $A\{M,(B1,B2)\}O_3$ (A is at least one selected from Ba, Sr and Ca, B1 is at least one selected from In, Y, Zn and Mg, B2 is at least one selected from Ta and Nb, and M is at least one selected from Ti, Zr, Hf and Sn) and at least Fe and Cu as sub-components. When the Fe content and Cu content in the translucent ceramic are x and y, respectively, $3x+y$ is 40 ppm by weight or less so that the hybrid lens (3) having excellent uniformity in optical properties and no crack defect can be obtained.

20 Claims, 1 Drawing Sheet

U.S. PATENT DOCUMENTS

| | | | | |
|---|---|---|---|---|
| 5,112,433 | A * | 5/1992 | Dawson et al. | 423/593.1 |
| 5,453,262 | A * | 9/1995 | Dawson et al. | 501/124 |
| 5,824,278 | A * | 10/1998 | Yao | 423/263 |
| 6,451,420 | B1 * | 9/2002 | Jin et al. | 428/315.5 |
| 6,482,525 | B1 * | 11/2002 | Kasemann et al. | 428/447 |
| 6,620,752 | B2 * | 9/2003 | Messing et al. | 501/136 |
| 6,908,872 | B2 * | 6/2005 | Tanaka et al. | 501/135 |
| 6,939,908 | B1 * | 9/2005 | Singhal et al. | 524/430 |
| 7,169,834 | B2 * | 1/2007 | Dobler et al. | 524/10 |
| 7,378,050 | B2 * | 5/2008 | Tanaka et al. | 264/1.22 |
| 2003/0181311 | A1 * | 9/2003 | Tanaka et al. | 501/135 |
| 2005/0104265 | A1 * | 5/2005 | Tanaka et al. | 264/648 |
| 2008/0064584 | A1 * | 3/2008 | Kuretake et al. | 501/10 |

FOREIGN PATENT DOCUMENTS

| | | | |
|---|---|---|---|
| JP | 04-147103 | * | 5/1992 |
| JP | 6-93043 | | 11/1994 |
| JP | 2000-281346 | * | 10/2000 |
| JP | 2002-187767 | * | 7/2002 |
| JP | 2003-048792 | | 2/2003 |
| JP | 2004-75512 | | 3/2004 |
| JP | 2004-075512 | * | 3/2004 |
| JP | 2004-091271 | * | 3/2004 |
| WO | WO 02/49984 | * | 6/2002 |
| WO | GB 2 402 936 | * | 12/2004 |

\* cited by examiner

HYBRID LENS USING TRANSLUCENT CERAMIC

This is a continuation of application Ser. No. PCT/JP2005/014743, filed Aug. 11, 2005.

TECHNICAL FIELD

The present invention relates to a hybrid lens formed by combining translucent ceramic and a resin with translucency.

BACKGROUND ART

Materials such as glass materials, resin materials, single crystals and translucent ceramics have been conventionally used for lenses which are used as optical components for cameras and the like. In digital video cameras and digital still cameras applications, it is necessary to miniaturize optical systems, and it is desired to reduce the size of the lens itself and/or the number of lenses.

As possible means for reducing the number of lenses, the lenses are formed in an aspherical shape. This is because aspherical lenses are capable of correcting various aberrations, such as spherical aberration, while making use of the characteristic values of the materials of the lenses in comparison to spherical lenses. Furthermore, the size of a lens can be reduced by increasing the refractive index of the lens material.

In order to form an aspherical lens, a translucent resin film in an aspherical shape may be laminated on and bonded to a spherical lens serving as a lens base material using a glass material or translucent ceramic. This method is capable of forming an aspherical lens even when a lens base material cannot be spherically processed by molding. The resulting lens is referred to as a "hybrid lens".

A general method for forming an aspherical hybrid lens is as follows. A predetermined amount of ultraviolet curable resin is poured into an aspherical mold provided with a transfer layer corresponding to a desired aspherical shape, and a surface of a lens base material which is to be formed in an aspherical shape is fixed to the mold so as to face the mold surface while keeping a constant distance between the surface and the mold. Then, the lens base material is irradiated with ultraviolet light to cure the resin. In this case, the resin is irradiated with ultraviolet light transmitted through the lens base material. Patent Document 1 discloses a composite aspherical lens as a conventional example in which an aspherical ultraviolet cured resin film is laminated on a spherical lens composed of a glass material.

As a resin other than the ultraviolet curable resin which can be used, a thermosetting resin has been employed. In this case, however, there is the problem that the formed aspherical shape has relatively low dimensional accuracy. In addition, it is necessary to precisely control heating and cooling conditions, and thus the thermosetting resin method is undesirable from the viewpoint of mass productivity. Therefore, a ultraviolet curable resin is generally used.

If the refractive indexes of the lens base material and the ultraviolet curable resin can be increased, the hybrid lens can be miniaturized to promote the miniaturization of an optical system. Patent Document 2 discloses translucent ceramic composed of a Ba{Sn, Zr (Mg, Ta)}O₃ perovskite-type oxide having a refractive index of as high as 2.0 or more. In this specification, the term "refractive index" represents the refractive index at the visible light d-line (wavelength of 587.56 nm) unless otherwise specified.

However, lens materials composed of glass, which is typified in Patent Document 1, generally has a low refractive index of less than 2 and are thus disadvantageous for miniaturizing lenses. Although there are glass materials having a high refractive index of about 2.00, these materials have the problem of low ultraviolet transmittance when used as lens base materials.

More particularly, when the ultraviolet curable resin is irradiated with ultraviolet light, the intensity of the ultraviolet light applied to the resin varies according to site irradiated because the thickness of the lens material varies according to site, thereby causing a site dependency for the degree of resin curing. Therefore, the cured resin has a lack of homogeneity, and the optical properties of a hybrid lens as a completed product, i.e., the refractive index and transmittance, undesirably have site dependency. In addition, the lens may become cracked due to the occurrence of nonuniform stress.

On the other hand, if a lens base material has sufficiently high transmittance for ultraviolet light, even when the thickness of the lens material somewhat varies according to site, resin curing is little affected.

Patent Document 1: Japanese Examined Patent Application Publication No. 6-93043
Patent Document 2: Japanese Unexamined Patent Application Publication No. 2004-75512

DISCLOSURE OF INVENTION

Problem to be Solved by the Invention

The present invention has been achieved in consideration of the above-mentioned problems, and an object of the invention is to provide a hybrid lens having excellent uniformity in optical properties and producing a small amount of cracking even when a translucent ceramic having a refractive index of as high as 2.0 or more and a high ultraviolet transmittance material is used as a lens base material.

Means for Solving the Problems

A hybrid lens according to the present invention includes a lens base material composed of translucent ceramic containing as a main component, an oxide with a perovskite structure which is represented by $$A\{M,(B1,B2)\}O_3$$

(A is at least one selected from Ba, Sr and Ca, B1 is at least one selected from In, Y, Zn and Mg, B2 is at least one selected from Ta and Nb, and M is at least one selected from Ti, Zr, Hf and Sn) and at least Fe and Cu as sub-components), and a resin film composed of a ultraviolet curable (or cured) resin and formed on the surface of the lens base material, wherein when the Fe content and Cu content in the translucent ceramic are x and y, respectively, 3x+y is 40 ppm by weight or less, and the translucent ceramic has an internal transmittance of 90% or more at a sample thickness of 0.6 mm for visible light at a wavelength of 633 nm, an internal transmittance of 60% or more at a sample thickness of 0.6 mm for ultraviolet light at a wavelength of 365 nm, and preferably a refractive index of 2.01 or more at visible light d-line (wavelength 587.56 nm).

The ultraviolet curable resin constituting the resin film provided in the hybrid lens of the present invention preferably contains dispersed ceramic particles having an average particle diameter of 50 nm or less.

The ceramic particles dispersed in the ultraviolet curable resin preferably has a main component composition of at least one type selected from an A{M, (B1, B2)}O₃ type (A is at least one selected from Ba, Sr and Ca, B1 is at least one selected from In, Y, Zn and Mg, B2 is at least one selected from Ta and Nb, and M is at least one selected from Ti, Zr, Hf and Sn), a barium titanate type, a strontium titanate type, a calcium titanate type, and a titanium oxide type.

In this case, a plate-shaped sample prepared by forming the resin film with a thickness of 30 μm on the surface of the plate-shaped translucent ceramic preferably having an internal transmittance of 90% or more for visible light at a wavelength of 633 nm and a refractive index of 2.01 or more at visible light d-line (wavelength 587.5 nm).

In the hybrid lens of the present invention, the lens base material preferably has a spherical lens shape.

The hybrid lens of the present invention preferably constitutes an aspherical lens.

Advantage of the Invention

According to the present invention, it is possible to increase the refractive index to 2.01 or more and increase the ultraviolet transmittance in a lens base material composed of translucent ceramic. Therefore, a hybrid lens having excellent uniformity in optical properties and a small degree of cracking can be obtained.

Therefore, the hybrid lens according to the present invention is capable of decreasing the size of the lens and/or decreasing the number of lenses in an optical device such as a digital still camera, thereby contributing to miniaturization of an optical device.

When ceramic particles with an average particle diameter of 50 nm or less are dispersed in the ultraviolet curable resin constituting the resin film provided in the hybrid lens of the present invention, the refractive index can be effectively improved.

REFERENCE NUMERALS 1 spherical lens
2 resin film
3 hybrid lens

BEST MODE FOR CARRYING OUT THE INVENTION

First, the composition of translucent ceramic constituting a lens base material provided in a hybrid lens according to the present invention will be described.

The translucent ceramic contains as a main component an oxide with a perovskite structure represented by (A is at least one selected from Ba, Sr and Ca, B1 is at least one selected from In, Y, Zn and Mg, B2 is at least one selected from Ta and Nb, and M is at least one selected from Ti, Zr, Hf and Sn) and at least Fe and Cu as sub-components. When the Fe content and the Cu content in the translucent ceramic are x and y, respectively, 3x+y is 40 ppm by weight or less. In addition, the translucent ceramic has an internal transmittance of 90% or more at a sample thickness of 0.6 mm for visible light at a wavelength of 633 nm.

The internal transmittance is determined from the theoretical transmittance of a sample and the measured linear transmittance of the sample according to the following equations (1) to (3):

Internal transmittance [%]=linear transmittance/theoretical transmittance×100 (1)

Theoretical transmittance [%]=$(1-R)^2/(1-R^2)$×100 (2)

$R=(n-1)^2/(n+1)^2$ (3)

In equation (3), R represents reflectance, and n represents refractive index.

When light from the air enters a sample having a high refractive index, reflection inevitably occurs due to a difference in refractive index at the interface, and thus the linear transmittance as a measured value never becomes 100%. The theoretical transmittance means transmittance on the assumption that the transmittance only in a sample is made 100% by removing the influence of reflection due to a difference in refractive index. Therefore, the ratio of the linear transmittance as a measured value to the theoretical transmittance is determined so that the transmittance only in the sample without the influence of reflection can be evaluated. The reflection can be mostly removed by forming a antireflective film if desired. Therefore, the transmittance of a sample is preferably evaluated by the internal transmittance without the influence of reflection.

The translucent ceramic used as a material for the lens base material in the hybrid lens of the present invention has an internal transmittance for ultraviolet light at a wavelength of 365 nm of 60% or more at a sample thickness having a thickness of 0.6 mm.

The internal transmittance of a translucent material generally tends to decrease with decreases in wavelength. However, as described above, when the total content of Fe and Cu, 3x+y, is controlled to 40 ppm by weight or less, the transmittance for short-wavelength light, such as ultraviolet light, can be improved.

However, even when the Fe content is sufficiently close to 0, the internal transmittance for ultraviolet light is decreased at a high Cu content. The same applies to the case in which the relation between Fe and Cu is reversed. In other words, it is necessary to simultaneously control the contents of both the Fe and Cu. In the present invention, it was found that in order to improve the transmittance of translucent ceramic for ultraviolet light, it is most effective to control the total of triple of the Fe content plus the Cu content to a predetermined value or less.

The total content, 3x+y, is more preferably controlled to 20 ppm by weight or less because the internal transmittance is then 80% or more at a sample thickness of 0.6 mm for ultraviolet light at a wavelength of 365 nm.

A possible reason why the internal transmittance for ultraviolet light is decreased when Fe and Cu are present in translucent ceramic is that the energy of intrinsic absorption peaks of Fe ions and Cu ions substituted for some of the atoms in a crystal substantially corresponds to ultraviolet energy. As described above, the influence of Fe on ultraviolet light is three times as large as that of Cu, but the reason for this is unclear.

In the present invention, the main component of the translucent ceramic is a perovskite-type oxide represented by A{M, (B1, B2)}$O_3$ (A is at least one selected from Ba, Sr and Ca, B1 is at least one selected from In, Y, Zn and Mg, B2 is at least one selected from Ta and Nb, and M is at least one selected from Ti, Zr, Hf and Sn). Therefore, the correlation between ultraviolet transmittance and (3x+y) is further enhanced, and thus the effect of control of (3x+y) becomes more significant.

Further, the translucent ceramic containing the perovskite-type oxide as the main component can exhibit a refractive index of 2.01 or more at visible light d-line (wavelength 587.56 nm). This is very advantageous for miniaturizing a lens.

Next, a method for producing the translucent ceramic constituting the lens base material in the hybrid lens of the present invention will be described.

The perovskite-type oxide represented by A{M, (B1, B2)}$O_3$ as the main component of the translucent ceramic can be produced by substantially the same production method as in Patent Document 2.

The ceramic usually contains Fe and Cu as impurities. In order to control the Fe content and the Cu content in ceramic, it is effective to previously suppress the Fe content and the Cu content in raw materials such as $BaCO_3$, $MgCO_3$ and $Ta_2O_5$, which are used for synthesizing the A{M, (B1, B2)}$O_3$ by repeated purification. A plurality of raw materials having different Fe and Cu contents is prepared, and a mixture thereof is used to suppress variations in the Fe content and the Cu content in the ceramic.

It is also important to prevent mixing of excess Fe and Cu in the process for producing ceramic. For example, when a material composed of Fe and Cu is used for a blade of a grinder, in order to prevent mixing additional Fe and Cu due to wearing of the blade, it is important to take appropriate measures for preventing excessively strong grinding.

Next, the constitution of the hybrid lens including the translucent ceramic and a method for producing the hybrid ceramic will be described.

The hybrid lens of the present invention is constructed by forming a resin film composed of an ultraviolet curable resin on the surface of the lens base material composed of the translucent ceramic.

In particular, when an aspherical lens useful for correcting various aberrations such as spherical aberration is formed, the lens base material is formed using the spherically processed translucent ceramic, and a resin film composed of a translucent ultraviolet curable resin is formed on the spherical lens material to form an aspherical shape. Aspherical processing of ceramic is difficult, but a liquid of the resin before curing can be poured into a mold and then molded, thereby permitting easy aspherical processing. The complex of the lens base material composed of the translucent ceramic and the aspherical resin film formed thereon constitutes the hybrid lens.

Since the ultraviolet curable resin is used as the resin, a heating-cooling process peculiar to thermosetting resins is not required. Temperature control is not required, and the problem of cracking and/or dimensional error does not occur due to the occurrence of stress by thermal expansion and shrinkage.

However, when using the ultraviolet curable resin, ultraviolet light is transmitted through the lens material and applied to the resin liquid, and thus, as described above, the lens material is required to have a high internal transmittance for ultraviolet light. This is because the lens base material frequently has a shape in which the thickness near an optical axis greatly differs from that near the periphery. When the internal transmittance for ultraviolet light is low, the curing rate of the resin near the optical axis of the lens greatly differs from that near the periphery thereof, thereby producing a resin film after curing which has a lack of uniformity in optical properties and producing crack defects in the resin film. When the lens material at a thickness of 0.6 mm has an internal transmittance of 60% or more for ultraviolet light at a wavelength of 365 nm, forming the lens material into a general spherical shape causes substantially no problem of crack defects. In particular, when the internal transmittance is 80% or more, even in the lens material having a special shape, for example, a biconvex lens with a small radius of curvature, crack defects of the resin film can be securely prevented.

As the ultraviolet curable resin, a resin prepared by appropriately combining an acrylic monomer such as an acrylate monomer, polyester acrylate, epoxy acrylate, urethane acrylate, silicone acrylate or polybutadiene acrylate, and an oligomer is mainly used. Also, a polyethylene-thiol oligomer and a vinyl ether type can be used. Further, the efficiency of curing by ultraviolet irradiation is improved by adding a photopolymerization initiator such as a radical polymerization initiator or a cationic polymerization initiator.

From the view of uniformity in optical properties of the hybrid lens, the refractive indexes of the lens base material and the resin film are preferably the same. As described above, the translucent ceramic constituting the lens base material provided in the hybrid lens of the present invention preferably has a refractive index of as high as 2.01. Therefore, the ultraviolet cured resin film preferably has a refractive index of 2.01 or more.

However, the ultraviolet cured resin single film frequently has a refractive index of less than 2. Therefore, the refractive index of the resin film can be improved by dispersing ceramic particles (referred to as "nanoparticles" hereinafter) having an average particle diameter of 50 nm or less in the resin.

In particular, when the translucent ceramic constituting the lens base material contains as the main component, a perovskite oxide represented by A{M, (B1, B2)}$O_3$, the composition of the ceramic main component of the nanoparticles is preferably an A{M, (B1, B2)}$O_3$ type, a barium titanate type, a strontium titanate type, a calcium titanate type, and a titanium oxide type. The nanoparticles may be a mixture of a plurality of types of nanoparticles having these compositions.

The average particle diameter of the nanoparticles is preferably 50 nm or less. When the average particle diameter exceeds 50 nm, the transmittance of the resin film for visible light is undesirably decreased. In other words, a plate-shaped complex having a thickness of 0.6 mm (resin film having a thickness of 30 µm) and prepared by forming a resin film on plate-shaped translucent ceramic has an internal transmittance of less than 90% for visible light at a wavelength of 633 nm. In this case, the visible light transmittance of the hybrid lend is also decreased.

Although the refractive index of the resin film varies depending on the type of the composition of the nanoparticles, the refractive index of the resin film tends to increase as the amount of the nanoparticles added increases.

When the uniformity of the nanoparticles in the resin film is degraded, the internal transmittance may be decreased. Therefore, when the average particle diameter of the nanoparticles is decreased or the amount of the nanoparticles added is increased, consideration is required for dispersing the nanoparticles as uniformly as possible. In mixing the nanoparticles in the resin liquid, a general method such as a ball mill may be used as a dispersion method, but, if possible, a dispersant is preferably used. As the dispersant, a nonionic dispersant, for example, hexametaphosphate or polyol, can be used. Also, a polymeric anionic dispersant, such as polycarboxylic acid, polymaleic acid, or polysulfonic acid, can be used.

In order to improve the adhesion at the interface between the sphere of the lens base material and the resin film, a silane coupling agent can be used.

Although, the resin film has an aspherical surface in the above description, the present invention is not limited to this, and the resin film surface may be a usual spherical surface.

EXPERIMENTAL EXAMPLE 1

This example was performed for examining the relation between the Fe and Cu contents in translucent ceramic containing a specified main component and the presence of cracks in a hybrid lens.

As raw materials, $BaCO_3$, $MgCO_3$, $Ta_2O_5$, $SnO_2$ and $ZrO_2$ with various purities of 2N (99% or more) to 5N (99.999% or more) were prepared. The Fe and Cu contents of each of the raw materials were previously analyzed by ICP-AES (inductively coupled plasma-atomic emission spectroscopy). Each of the raw materials was weighed so as to obtain a composition represented by $Ba\{(Sn_{0.67}Zr_{0.33})_{0.16}Mg_{0.29}Ta_{0.55}\}_{1.02}O_3$ and obtain each of the values of the Fe and Cu contents shown in Table 1, followed by wet mixing for 16 hours with a ball mill. The resultant mixture was dried and then calcined at 1300° C. for 3 hours to obtain a raw material powder composed of a composite exhibiting a perovskite structure.

The resultant raw material powder was placed in a ball mill together with water and a binder composed of ethyl cellulose, followed by wet grinding for 16 hours. The resulting slurry containing the ground raw material powder was dried and then granulated through a 50-mesh net (screen), and the resulting powder was pressed under a pressure of 196 MPa to obtain a disk-like molded product having a diameter of 30 mm and a thickness of 2 mm.

Next, the molded product was buried in a powder having the same composition. The powder with the same composition as the molded product was prepared by burning a raw material having the same composition as the molded product and then grinding the raw material.

The molded product buried in the powder with the same composition was placed in a burning furnace and then heated at a temperature of 300° C. to 500° C. in an air atmosphere to remove the binder. Then, oxygen was introduced into the furnace while the temperature was increased, and the oxygen concentration in the burning atmosphere was increased to about 98% at the maximum temperature of 1600° C. or 1650° C. The burning temperature and the oxygen concentration were maintained, and the molded product was burned for 20 hours to obtain a sintered compact. The resulting sintered compact was finished to a disk shape of 0.6 mm in thickness by mirror processing to form a translucent ceramic sample.

Each of the obtained samples was measured for internal transmittance at a thickness of 0.6 mm for visible light at a wavelength of 633 nm and for ultraviolet light at a wavelength of 365 nm using Shimadzu Corporation spectrophotometer (UV-200S). The results are shown in Table 1. In sample Nos. 5, 9, 11, 14, 23, 27, 29 and 32 in which (3x+y) exceeds 40, the internal transmittance for ultraviolet light is less than 60%, which is out of the range of the present invention.

Next, $TiO_2$ particles and $BaTiO_3$ particles having an average particle diameter of 20 nm were prepared as nanoparticles by a coprecipitation method. Also, a photopolymerization initiator composed of a benzoin ether derivative was added to a polymethyl methacrylate resin to prepare an acrylic ultraviolet curable resin liquid. These nanoparticles were weighed in the amounts shown in Table 1 and mixed with the resin liquid together with a dispersant composed of a hexametaphosphate, followed by uniform dispersion with a ball mill. The refractive index of the ultraviolet curable resin containing the dispersed nanoparticles was measured with a prism coupler (MODEL2010) manufactured by Metricon Corporation. The results are shown in Table 1. All samples showed a good value of refractive index of 2.01 or more.

The ultraviolet curable resin containing the dispersed nanoparticles before curing was deposited by a spin coating method on each of the translucent ceramic samples (thickness. 0.6 mm) prepared as described above and shown in Table 1 and then cured by ultraviolet light irradiation at a wavelength of 365 nm. The thickness of the resin film after curing was 30 μm. A plate-shaped composite sample including the resin film formed therein was measured for internal transmittance for visible light at a wavelength of 633 nm. The results are shown in Table 1. All samples showed a good value of internal transmittance of 90% or more.

Next, a hybrid lens was formed by the method described below using each of the translucent ceramic samples and each of the ultraviolet curable resins containing the dispersed nanoparticles shown in Table 1.

Figure 1:
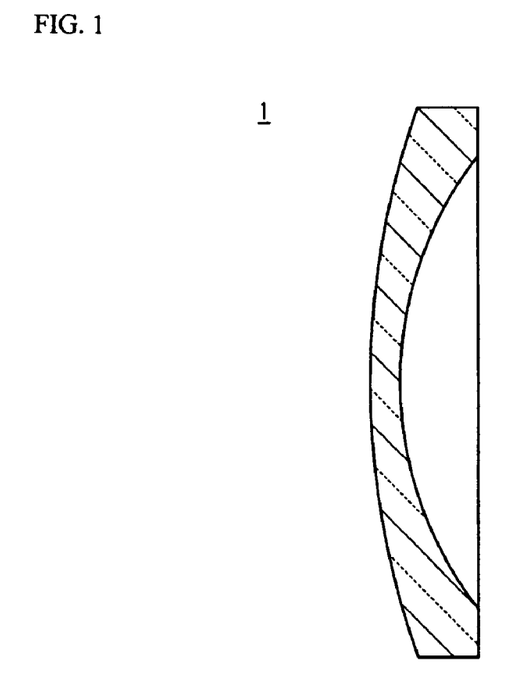
FIG. 1 is a sectional view showing an example of a spherical lens composed of translucent ceramic and constituting a lens base material provided in a hybrid lens according to an embodiment of the present invention.

Namely, each of the translucent ceramic samples shown in Table 1 was processed into a spherical lens 1 shown in FIG. 1 by polishing. In the spherical lens 1, the diameter was 5 mm, the radius of curvature of the convex surface was 7.5 mm, the radium of curvature of the concave surface was 3.4 mm, the thickness of the thinnest portion was 0.27 mm, and the thickness of the thickest portion with a lens effective diameter was 0.74 mm. Namely, the thickness of the thickest portion was 2.7 times the thickness of the thinnest portion.

An aspherical hybrid lens was formed by the general method described below, which is well known as a method for producing a composite aspheric lens, using each of the translucent ceramic spherical lenses and each of the ultraviolet curable resins containing the dispersed nanoparticles shown in Table 1.

Figure 2:
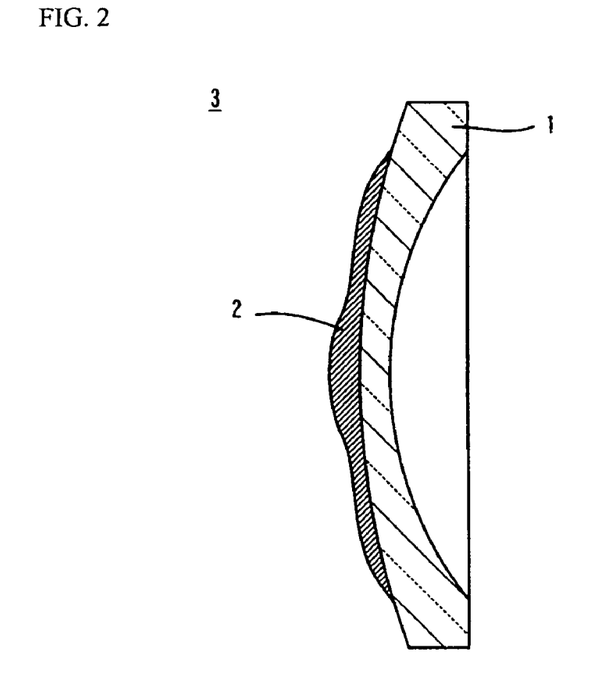
FIG. 2 is a sectional view showing a hybrid lens including the spherical lens shown in FIG. 1 as a lens base material.

Namely, a predetermined amount of each ultraviolet curable resin containing the dispersed nanoparticles was poured into an aspherical mold provided with a transfer layer corresponding to a desired aspherical shape, and the convex surface of the spherical lens 1 used as a lens base material was fixed to the mold to face the mold surface so that a constant distance between the convex surface and the mold was kept constant. Then, the resin base material side was irradiated with ultraviolet light at a wavelength of 365 nm to cure the ultraviolet curable resin and form an aspherical ultraviolet cured resin film 2. The resultant aspherical hybrid lens 3 is shown in FIG. 2. The surface of the resin film was an aspherical surface axially symmetric with respect to the optical axis as shown in FIG. 2.

The surface state of the cured resin film 2 in the hybrid lens 3 formed as described above was observed through an optical microscope. The results of the observation for the presence of cracks in the resin film 2 are shown in Table 1.

TABLE 1

| Sample No. | Impurity contained in translucent ceramic (x:Fe, y:Cu) | | | Internal transmittance of translucent ceramic (x:Fe, y:Cu) | | Main component of nano-particle | Diameter of nano-particle (nm) | Content of nano-particle % by weight | Refractive index of nano-particle-dispersed resin | Internal transmittance of plate-shaped composite sample (wavelength 633 nm) (thickness 0.6 mm) | Crack in resin film of hybrid lens |
|---|---|---|---|---|---|---|---|---|---|---|---|
| | x (ppm by weight) | y (ppm by weight) | 3x + y (ppm by weight) | Wavelength 633 nm | Wavelength 365 nm | | | | | | |
| 1 | 0.5 | 1 | 2.5 | 99.3 | 93.4 | TiO$_2$ | 20 | 38 | 2.08 | 98.3 | Absent |
| 2 | 0.5 | 11 | 12.5 | 99.0 | 81.1 | TiO$_2$ | 20 | 38 | 2.08 | 98.0 | Absent |
| 3 | 0.5 | 31 | 32.5 | 98.9 | 66.8 | TiO$_2$ | 20 | 38 | 2.08 | 97.9 | Absent |
| 4 | 1.0 | 37 | 40 | 99.2 | 62.1 | TiO$_2$ | 20 | 38 | 2.08 | 98.2 | Absent |
| *5 | 1.0 | 40 | 43 | 99.3 | 53.2 | TiO$_2$ | 20 | 38 | 208 | 98.3 | Present |
| 6 | 1.5 | 1 | 5.5 | 98.8 | 91.6 | TiO$_2$ | 20 | 38 | 2.08 | 97.8 | Absent |
| 7 | 3.5 | 1 | 11.5 | 99.1 | 83.7 | TiO$_2$ | 20 | 38 | 2.08 | 98.1 | Absent |
| 8 | 5.6 | 1 | 17.8 | 99.3 | 82.6 | TiO$_2$ | 20 | 38 | 2.08 | 98.3 | Absent |
| *9 | 5.6 | 31 | 47.8 | 99.5 | 56.4 | TiO$_2$ | 20 | 38 | 2.08 | 98.5 | Present |
| 10 | 6.0 | 2 | 20 | 99.1 | 80.2 | TiO$_2$ | 20 | 38 | 2.08 | 98.1 | Absent |
| *11 | 6.0 | 31 | 49 | 99.3 | 55.6 | TiO$_2$ | 20 | 38 | 2.08 | 98.3 | Present |
| 12 | 7.0 | 1 | 22 | 99.4 | 75.2 | TiO$_2$ | 20 | 38 | 2.08 | 98.4 | Absent |
| 13 | 10.5 | 1 | 32.5 | 99.7 | 63.1 | TiO$_2$ | 20 | 38 | 2.08 | 98.7 | Absent |
| *14 | 15.1 | 1 | 46.3 | 99.1 | 46.1 | TiO$_2$ | 20 | 38 | 208 | 98.1 | Present |
| 15 | 0.5 | 1 | 2.5 | 99.3 | 93.4 | TiO$_2$ | 20 | 31 | 2.01 | 99.4 | Absent |
| 16 | 0.5 | 1 | 2.5 | 99.3 | 93.4 | TiO$_2$ | 20 | 36 | 2.06 | 98.6 | Absent |
| 17 | 0.5 | 1 | 2.5 | 99.3 | 93.4 | TiO$_2$ | 20 | 40 | 2.10 | 98.0 | Absent |
| 18 | 0.5 | 1 | 2.5 | 99.3 | 93.4 | TiO$_2$ | 20 | 44 | 2.14 | 97.3 | Absent |
| 19 | 0.5 | 1 | 2.5 | 99.3 | 93.4 | BaTiO$_3$ | 20 | 61 | 2.08 | 95.4 | Absent |
| 20 | 0.5 | 11 | 12.5 | 99.0 | 81.1 | BaTiO$_3$ | 20 | 61 | 2.08 | 95.1 | Absent |
| 21 | 0.5 | 31 | 32.5 | 98.9 | 66.8 | BaTiO$_3$ | 20 | 61 | 2.08 | 95.0 | Absent |
| 22 | 1.0 | 37 | 40 | 99.2 | 62.1 | BaTiO$_3$ | 20 | 61 | 2.08 | 95.3 | Absent |
| *23 | 1.0 | 40 | 43 | 99.3 | 53.2 | BaTiO$_3$ | 20 | 61 | 2.08 | 95.4 | Present |
| 24 | 1.5 | 1 | 5.5 | 98.8 | 91.6 | BaTiO$_3$ | 20 | 61 | 2.08 | 94.9 | Absent |
| 25 | 3.5 | 1 | 11.5 | 99.1 | 83.7 | BaTiO$_3$ | 20 | 61 | 2.08 | 95.2 | Absent |
| 26 | 5.6 | 1 | 17.8 | 99.3 | 82.6 | BaTiO$_3$ | 20 | 61 | 2.08 | 95.4 | Absent |
| *27 | 5.6 | 31 | 47.8 | 99.5 | 56.4 | BaTiO$_3$ | 20 | 61 | 2.08 | 95.5 | Present |
| 28 | 6.0 | 2 | 20 | 99.1 | 80.2 | BaTiO$_3$ | 20 | 61 | 2.08 | 95.2 | Absent |
| *29 | 6.0 | 31 | 49 | 99.3 | 55.6 | BaTiO$_3$ | 20 | 61 | 2.08 | 95.4 | Present |
| 30 | 7.0 | 1 | 22 | 99.4 | 75.2 | BaTiO$_3$ | 20 | 61 | 2.08 | 95.5 | Absent |
| 31 | 10.5 | 1 | 32.5 | 99.7 | 63.1 | BaTiO$_3$ | 20 | 61 | 2.08 | 95.7 | Absent |
| *32 | 15.1 | 1 | 46.3 | 99.1 | 46.1 | BaTiO$_3$ | 20 | 61 | 2.08 | 95.2 | Present |
| 33 | 0.5 | 1 | 2.5 | 99.3 | 93.4 | BaTiO$_3$ | 20 | 50 | 2.01 | 95.5 | Absent |
| 34 | 0.5 | 1 | 2.5 | 99.3 | 93.4 | BaTiO$_3$ | 20 | 58 | 2.06 | 94.7 | Absent |
| 35 | 0.5 | 1 | 2.5 | 99.3 | 93.4 | BaTiO$_3$ | 20 | 65 | 2.10 | 94.1 | Absent |
| 36 | 0.5 | 1 | 2.5 | 99.3 | 93.4 | BaTiO$_3$ | 20 | 71 | 2.14 | 93.4 | Absent |

Samples marked with * are out of the range of the present invention.

In sample Nos. 5, 9, 11, 14, 23, 27, 29 and 32 in which, as described above, (3x+y) of the translucent ceramic used as the lens base material exceeds 40 ppm by weight, the internal transmittance for ultraviolet light at a wavelength of 365 nm is less than 60%, and cracks occur in the resin films.

EXPERIMENTAL EXAMPLE 2

In this experimental example, the main component of translucent ceramic, the type of the ultraviolet curable resin, and the main component, particle diameter, or amount of the nanoparticles added were variously changed to evaluate optical properties.

Translucent ceramics composed of various materials shown in Table 2 were prepared by the same production method as in Experimental Example 1. In all samples, each of the Fe and Cu contents was controlled to as low as 1 to 2 ppm. The refractive indexes of the samples were measured by the same method as in Experimental Example 1. The results are shown in Tables 4 and 5. The samples showed a refractive index of as high as 2.01 or more.

In addition, nanoparticles having various average particle diameters and composed of the materials shown in Table 3 as main components were prepared. A predetermined amount of the nanoparticles was dispersed in an acrylic or epoxy ultraviolet curable resin material shown in Table 4 and 5. The acrylic resin material was the same as in Experimental Example 1, and the epoxy resin material was prepared by adding a photopolymerization initiator composed of an aromatic sulfonium salt to bisphenol A resin. The refractive indexes of the samples were measured by the same method as in Experimental Example 1. The results are shown in Tables 4 and 5. The samples showed a refractive index of as high as 2.01 or more.

Further, each of the ultraviolet cured resin films shown in Tables 4 and 5 was formed on each of the translucent ceramic samples of 0.6 mm in thickness shown in Tables 4 and 5 by the same method as in Experimental Example 1 to prepare a plate-shaped composite sample. The internal transmittance of each sample for visible light at a wavelength of 633 nm was measured by the same method as in Experimental Example 1.

The results are shown in Tables 4 and 5. In sample Nos. 53, 57, 61, 64, 67, 70, 73, 76, 79, 83, 86, 90 and 93 in which the average particle diameter of the nanoparticles exceeds 50 nm, the internal transmittance is less than 90%.

Next, the same aspherical hybrid lens as in Experimental Example 1 was formed by the same method using the translucent ceramic and each ultraviolet curable resin shown in Tables 4 and 5. In all samples, no crack occurs.

TABLE 2

| | |
|---|---|
| A | $Ba\{Sn_{0.107}Zr_{0.053}(Mg_{0.29}Ta_{0.55})\}_{1.02}O_3$ |
| B | $Ba\{Zr_{0.054}(Zn_{0.313}Ta_{0.633})\}_{1.005}O_3$ |
| C | $Ba\{Sn_{0.107}Zr_{0.053}(Mg_{0.29}Nb_{0.55})\}_{1.02}O_3$ |
| D | $Ba\{Hf_{0.144}Ti_{0.016}(Mg_{0.29}Ta_{0.55})\}_{1.02}O_3$ |
| E | $(Ba_{0.8}Ca_{0.2})(Ti_{0.24}Mg_{0.26}Ta_{0.50})_{0.99}O_3$ |
| F | $Sr(Y_{0.495}Ta_{0.505})_{1.02}O_3$ |
| G | $Ba(Y_{0.495}Ta_{0.505})_{1.02}O_3$ |

TABLE 2-continued

| | |
|---|---|
| H | $Sr(In_{0.495}Ta_{0.505})_{1.02}O_3$ |
| I | $Sr\{Sn_{0.107}Zr_{0.053}(Mg_{0.29}Ta_{0.55})\}_{1.02}O_3$ |
| J | $Ba(In_{0.495}Ta_{0.505})_{1.02}O_3$ |

TABLE 3

| | |
|---|---|
| a | $Ba\{Hf_{0.144}Ti_{0.016}(Mg_{0.29}Ta_{0.55})\}_{1.02}O_3$ |
| b | $Ba\{Sn_{0.107}Zr_{0.053}(Mg_{0.29}Ta_{0.55})\}_{1.02}O_3$ |
| c | $Ba\{Sn_{0.107}Zr_{0.053}(Mg_{0.29}Nb_{0.55})\}_{1.02}O_3$ |
| d | $Ba\{Zr_{0.054}(Zn_{0.313}Ta_{0.633})\}_{1.005}O_3$ |
| e | $CaTiO_3$ |
| f | $SaTiO_3$ |
| g | $Ba(In_{0.495}Ta_{0.505})_{1.02}O_3$ |
| h | $(Ba_{0.8}Ca_{0.2})(Ti_{0.24}Mg_{0.26}Ta_{0.50})_{0.99}O_3$ |

TABLE 4

| Sample No. | Main component of translucent ceramic | Refractive index of translucent ceramic | Main component of ultraviolet curable resin | Main component of nanoparticle | Diameter of nanoparticle (nm) | Content of nanoparticle (% by weight) | Refractive index of nanoparticle-dispersed resin | Internal transmittance of plate-shaped composite sample (wavelength 633 nm) (thickness 0.6 mm) | Crack in resin film |
|---|---|---|---|---|---|---|---|---|---|
| 51 | A | 2.08 | Epoxy | a | 20 | 90 | 2.04 | 92.0 | No |
| 52 | A | 2.08 | Epoxy | a | 50 | 84 | 2.01 | 92.4 | No |
| *53 | A | 2.08 | Epoxy | a | 60 | 84 | 2.01 | 85.0 | No |
| 54 | B | 2.13 | Acrylic | b | 20 | 87 | 2.08 | 92.1 | No |
| 55 | B | 2.13 | Acrylic | b | 20 | 78 | 2.04 | 92.7 | No |
| 56 | B | 2.13 | Acrylic | b | 50 | 70 | 2.01 | 93.1 | No |
| *57 | B | 2.13 | Acrylic | b | 60 | 70 | 2.01 | 84.6 | No |
| 58 | B | 2.13 | Acrylic | c | 20 | 87 | 2.08 | 92.1 | No |
| 59 | B | 2.13 | Acrylic | c | 20 | 78 | 2.04 | 92.7 | No |
| 60 | B | 2.13 | Acrylic | c | 50 | 70 | 2.01 | 93.1 | No |
| *61 | B | 2.13 | Acrylic | c | 60 | 70 | 2.01 | 84.6 | No |
| 62 | C | 2.14 | Epoxy | d | 20 | 82 | 2.04 | 92.9 | No |
| 63 | C | 2.14 | Epoxy | d | 50 | 76 | 2.01 | 93.3 | No |
| *64 | C | 2.14 | Epoxy | d | 60 | 76 | 2.01 | 86.2 | No |
| 65 | D | 2.08 | Acrylic | b | 20 | 90 | 2.04 | 90.9 | No |
| 66 | D | 2.08 | Acrylic | b | 50 | 84 | 2.01 | 91.4 | No |
| *67 | D | 2.08 | Acrylic | b | 60 | 84 | 2.01 | 84.4 | No |
| 68 | A | 2.08 | Acrylic | e | 20 | 55 | 2.04 | 92.0 | No |
| 69 | A | 2.08 | Acrylic | e | 50 | 50 | 2.01 | 92.4 | No |
| *70 | A | 2.08 | Acrylic | e | 60 | 50 | 2.01 | 85.0 | No |
| 71 | A | 2.08 | Acrylic | f | 20 | 60 | 2.07 | 91.9 | No |
| 72 | A | 2.08 | Acrylic | f | 50 | 50 | 2.01 | 92.4 | No |
| *73 | A | 2.08 | Acrylic | f | 60 | 50 | 2.01 | 85.0 | No |

Samples marked with * are out of the range of the present invention.

TABLE 5

| Sample No. | Main component of translucent ceramic | Refractive index of translucent ceramic | Main component of ultraviolet curable resin | Main component of nanoparticle | Diameter of nanoparticle (nm) | Content of nanoparticle (% by weight) | Refractive index of nanoparticle-dispersed resin | Internal transmittance of plate-shaped composite sample (wavelength 633 nm) (thickness 0.6 mm) | Crack in resin film |
|---|---|---|---|---|---|---|---|---|---|
| 74 | E | 2.14 | Epoxy | g | 20 | 88 | 2.04 | 92.9 | No |
| 75 | E | 2.14 | Epoxy | g | 50 | 81 | 2.01 | 93.3 | No |
| *76 | E | 2.14 | Epoxy | g | 60 | 81 | 2.01 | 86.2 | No |
| 77 | F | 2.01 | Acrylic | b | 20 | 90 | 2.04 | 90.9 | No |
| 78 | F | 2.01 | Acrylic | b | 50 | 84 | 2.01 | 91.4 | No |
| *79 | F | 2.01 | Acrylic | b | 60 | 84 | 2.01 | 84.4 | No |
| 80 | G | 2.07 | Acrylic | h | 20 | 87 | 2.08 | 91.2 | No |
| 81 | G | 2.07 | Acrylic | h | 20 | 78 | 2.04 | 91.8 | No |

TABLE 5-continued

| Sample No. | Main component of translucent ceramic | Refractive index of translucent ceramic | Main component of ultraviolet curable resin | Main component of nanoparticle | Diameter of nanoparticle (nm) | Content of nanoparticle (% by weight) | Refractive index of nanoparticle-dispersed resin | Internal transmittance of plate-shaped composite sample (wavelength 633 nm) (thickness 0.6 mm) | Crack in resin film |
|---|---|---|---|---|---|---|---|---|---|
| 82 | G | 2.07 | Acrylic | h | 50 | 70 | 2.01 | 92.3 | No |
| *83 | G | 2.07 | Acrylic | h | 60 | 70 | 2.01 | 85.2 | No |
| 84 | H | 2.04 | Epoxy | d | 20 | 80 | 2.04 | 91.4 | No |
| 85 | H | 2.04 | Epoxy | d | 50 | 70 | 2.01 | 91.8 | No |
| *86 | H | 2.04 | Epoxy | d | 60 | 70 | 2.01 | 84.8 | No |
| 87 | I | 2.02 | Epoxy | d | 20 | 80 | 2.04 | 91.7 | No |
| 88 | I | 2.02 | Epoxy | d | 20 | 90 | 2.08 | 91.0 | No |
| 89 | I | 2.02 | Epoxy | d | 50 | 70 | 2.01 | 92.1 | No |
| *90 | I | 2.02 | Epoxy | d | 60 | 70 | 2.01 | 85.1 | No |
| 91 | J | 2.10 | Acrylic | h | 20 | 87 | 2.08 | 91.7 | No |
| 92 | J | 2.10 | Acrylic | h | 50 | 78 | 2.04 | 92.3 | No |
| *93 | J | 2.10 | Acrylic | h | 60 | 78 | 2.04 | 85.2 | No |

Samples marked with * are out of the range of the present invention.

In Experimental Example 2, hybrid lenses showing excellent optical properties were obtained using translucent ceramic materials with various compositions, the ultraviolet curable resins, and the nanoparticles. Therefore, it is understood that in carrying out the present invention, the conditions are not limited to those of the experimental examples.

The invention claimed is:

1. A hybrid lens comprising:
a lens base of translucent ceramic containing as a main component, an oxide with a perovskite structure represented by $$A\{M,(B1,B2)\}O_3$$

wherein A is at least one member selected from the group consisting of Ba, Sr and Ca, B1 is at least one member selected from the group consisting of In, Y, Zn and Mg, B2 is at least one member selected from the group consisting of Ta and Nb, and M is at least one member selected from the group consisting of Ti, Zr, Hf and Sn, and at least Fe and Cu as sub-components; and
a film of a ultraviolet curable resin on the surface of the lens base;
wherein when the Fe content and Cu content in the translucent ceramic are x and y, respectively, 3x+y is 40 ppm by weight or less, and the translucent ceramic has an internal transmittance of 90% or more at a sample thickness of 0.6 mm for visible light at a wavelength of 633 nm, and an internal transmittance of 60% or more at a sample thickness of 0.6 mm for ultraviolet light at a wavelength of 365 nm.

2. The hybrid lens according to claim 1, wherein the translucent ceramic has a refractive index of 2.01 or more at the visible light d-line (wavelength 587.56 nm).

3. The hybrid lens according to claim 2, wherein ceramic particles having an average particle diameter of 50 nm or less are dispersed in the ultraviolet curable resin.

4. The hybrid lens according to claim 3, wherein the ceramic particles dispersed in the ultraviolet curable resin have main component composition selected from the group consisting of A{M,(B1, B2)}O3, a barium titanate, a strontium titanate, a calcium titanate, a titanium oxide, and mixtures thereof.

5. The hybrid lens according to claim 4, wherein the ultraviolet curable resin is such that when a plate-shaped sample thereof has a thickness of 30 μon the surface of the plate-shaped translucent ceramic, it has an internal transmittance of 90% or more for visible light at a wavelength of 633 nm and a refractive index of 2.01 or more at the visible light d-line (wavelength 587.56 nm).

6. The hybrid lens according to claim 5, wherein 3x+y is 20 ppm by weight or less.

7. The hybrid lens according to claim 6, wherein the refractive indexes of the base and the film of resin are substantially the same.

8. The hybrid lens according to claim 7, wherein x is at least 0.5, and y is at least 1.

9. A hybrid lens comprising:
a lens base of translucent ceramic containing as a main component, an oxide with a perovskite structure represented by $$A\{M,(B1,B2)\}O_3$$

wherein A is at least one member selected from the group consisting of Ba, Sr and Ca, B1 is at least one member selected from the group consisting of In, Y, Zn and Mg, B2 is at least one member selected from the group consisting of Ta and Nb, and M is at least one member selected from the group consisting of Ti, Zr, Hf and Sn, and at least Fe and Cu as sub-components; and
a film of a cured resin on the surface of the lens base;
wherein when the Fe content and Cu content in the translucent ceramic are x and y, respectively, 3x+y is 40 ppm by weight or less, and the translucent ceramic has an internal transmittance of 90% or more at a sample thickness of 0.6 mm for visible light at a wavelength of 633 nm, and an internal transmittance of 60% or more at a sample thickness of 0.6 mm for ultraviolet light at a wavelength of 365 nm.

10. The hybrid lens according to claim 9, wherein the translucent ceramic has a refractive index of 2.01 or more at the visible light d-line (wavelength 587.56 nm).

11. The hybrid lens according to claim 10, wherein ceramic particles having an average particle diameter of 50 nm or less are dispersed in the resin.

12. The hybrid lens according to claim 11, wherein the ceramic particles dispersed in the resin have main component composition selected from the group consisting of A{M,(B1, B2)}O₃, a barium titanate, a strontium titanate, a calcium titanate, a titanium oxide, and mixtures thereof.

13. The hybrid lens according to claim 12, wherein the cured resin is such that when a plate-shaped sample thereof has a thickness of 30 μm on the surface of the plate-shaped translucent ceramic, it has an internal transmittance of 90% or more for visible light at a wavelength of 633 nm and a refractive index of 2.01 or more at the visible light d-line (wavelength 587.56 nm).

14. The hybrid lens according to claim 13, wherein $3x+y$ is 20 ppm by weight or less.

15. The hybrid lens according to claim 14, wherein the refractive indexes of the base and the film of resin are substantially the same.

16. The hybrid lens according to claim 15, wherein x is at least 0.5, and y is at least 1.

17. The hybrid lens according to claim 16, wherein the lens base has a spherical lens shape.

18. The hybrid lens according to claim 17, wherein the hybrid lens constitutes an aspherical lens.

19. The hybrid lens according to claim 9, wherein the lens base has a spherical lens shape.

20. The hybrid lens according to claim 19, wherein the hybrid lens constitutes an aspherical lens.

\* \* \* \* \*